(12) United States Patent
Hsu et al.

(10) Patent No.: US 8,602,625 B2
(45) Date of Patent: Dec. 10, 2013

(54) BACKLIGHT MODULE

(75) Inventors: Tun-Hao Hsu, Changhua County (TW);
Chang-Ho Shen, Hsinchu (TW);
Kuo-Chih Lee, Tainan County (TW)

(73) Assignee: Au Optronics Corporation, Hsinchu (TW)

( * ) Notice: Subject to any disclaimer, the term of this patent is extended or adjusted under 35 U.S.C. 154(b) by 407 days.

(21) Appl. No.: 12/905,104

(22) Filed: Oct. 15, 2010

(65) Prior Publication Data

US 2012/0051087 A1 Mar. 1, 2012

(30) Foreign Application Priority Data

Aug. 25, 2010 (TW) ............... 99128493 A

(51) Int. Cl.
*F21V 7/04* (2006.01)
(52) U.S. Cl.
USPC ............ 362/607; 362/600; 362/606; 362/634
(58) Field of Classification Search
USPC ................................. 362/600–634
See application file for complete search history.

(56) References Cited

U.S. PATENT DOCUMENTS

| | | | |
|---|---|---|---|
| 4,673,187 A | 6/1987 | Hanson et al. | |
| 7,651,249 B2 * | 1/2010 | Ohashi et al. | 362/373 |
| 2006/0171164 A1 * | 8/2006 | Kida | 362/608 |
| 2010/0045888 A1 * | 2/2010 | Naritomi | 349/58 |

FOREIGN PATENT DOCUMENTS

| | | |
|---|---|---|
| JP | 2000-199889 | 7/2000 |
| JP | 2005-227630 | 8/2005 |
| JP | 2007-094040 | 4/2007 |
| JP | 2009-063905 | 3/2009 |
| JP | 2009-203357 | 9/2009 |
| JP | 2010-054542 | 3/2010 |
| TW | M264728 | 5/2005 |
| TW | 200944106 | 10/2009 |
| TW | M371903 | 1/2010 |

OTHER PUBLICATIONS

"http://en.wikipedia.org/wiki/Young%27s_modulus" retrieved on Sep. 30, 2010.
"http://www.search.com/reference/Bi-metallic_strip" retrieved on Jul. 6, 2010.
"Office Action of Taiwan counterpart application" issued on Feb. 7, 2013, p. 1-7.

* cited by examiner

*Primary Examiner* — Sean Gramling
(74) *Attorney, Agent, or Firm* — Jianq Chyun IP Office

(57) ABSTRACT

A backlight module includes a back bezel, a light guide plate, a plurality of optical films, and a clamping device. The light guide plate is disposed in an area enclosed by a periphery structure of the back bezel, and the optical films are disposed on the light guide plate. The clamping device includes a supporting element, a clamping piece, and a cushion element. The supporting element protrudes from the back bezel. The clamping piece is disposed on the supporting element and extends from the back bezel to the optical films. The cushion element is disposed between the clamping piece and the optical films.

11 Claims, 3 Drawing Sheets

BACKLIGHT MODULE

CROSS-REFERENCE TO RELATED APPLICATION

This application claims the priority benefit of Taiwan application serial no. 99128493, filed on Aug. 25, 2010. The entirety of the above-mentioned patent application is hereby incorporated by reference herein and made a part of this specification.

BACKGROUND OF THE INVENTION

1. Field of the Invention

The invention relates to a clamping device. More particularly, the invention relates to a clamping device disposed on a backlight module.

2. Description of Related Art

In a liquid crystal display (LCD), a cold cathode fluorescent tube (CCFT) or a light emitting diode (LED) is often applied as a light source, and light emitted from the light source passes through a light guide plate and is guided to a display frame. Optical films are required for uniformizing the luminance of the LCD and maintaining the brightness of the entire frame without diminishing the brightness of the light source is not reduced. Currently, the backlight modules mainly adopt optical films (e.g., diffusers) to uniformize and concentrate the light.

However, during a vibration inspection on the backlight module or on the LCD, the optical films are apt to be scratched. Hence, the optical films are often suspended above the light guide plate to prevent movement of the optical films and thereby avoid scratches. Unfortunately, this leads to limited effects in preventing the scratches. On the other hand, in a miniaturized LCD module which employs the LED as the light source, the optical films and the light guide plate are rather close to each other, or the optical film are quite close to one another. Thus, the optical firms are more vulnerable to the scratches.

Given the optical films are firmly fixed, for example, by adhesion or through structural restriction, the optical films are prone to be wavy because of an uneven force received by the optical films. As such, optical performance of the backlight module is deteriorated.

SUMMARY OF THE INVENTION

The invention is directed to a backlight module with favorable durability.

An embodiment of the invention provides a backlight module that includes a back bezel, a light guide plate, a plurality of optical films, and a clamping device. The light guide plate is disposed in an area enclosed by a periphery structure of the back bezel. The optical films are disposed on the light guide plate. The clamping device includes a supporting element, a clamping piece, and a cushion element. The supporting element protrudes from the back bezel. The clamping piece is disposed on the supporting element and extends from the back bezel to the optical films. The cushion element is disposed between the clamping piece and the optical films.

According to an embodiment of the invention, the clamping piece is a bi-material clamping piece that includes a first material and a second material, and the second material is located between the first material and the cushion element.

According to an embodiment of the invention, a thermal expansion coefficient of the second material is greater than a thermal expansion coefficient of the first material.

According to an embodiment of the invention, the thermal expansion coefficient of the first material ranges from about 1 μm/m° C. to about 7 μm/m° C.

According to an embodiment of the invention, the thermal expansion coefficient of the second material ranges from about 22 μm/m° C. to about 30 μm/m° C.

According to an embodiment of the invention, the first material is a first metal layer.

According to an embodiment of the invention, the first metal layer is a Fe—Ni alloy layer.

According to an embodiment of the invention, the second material is a second metal layer.

According to an embodiment of the invention, the second metal layer is a Cu—Ni—Mn alloy layer or a Zn—Cu alloy layer.

According to an embodiment of the invention, a Young's modulus of the bi-material clamping piece ranges from about 100 GPa to about 180 GPa.

According to an embodiment of the invention, a thickness of the bi-material clamping piece ranges from about 0.5 mm to about 2 mm.

According to an embodiment of the invention, a material of the cushion element is rubber or silica gel.

According to an embodiment of the invention, a friction coefficient of the cushion element ranges from about 0.5 to about 1.

According to an embodiment of the invention, the supporting element has a through hole, and the bi-material clamping piece is locked onto the back bezel via a securing element that passes through the through hole.

According to an embodiment of the invention, the supporting element is a bi-material supporting element that includes a third material and a fourth material, and the fourth material is located between the third material and the optical films.

According to an embodiment of the invention, a thermal expansion coefficient of the fourth material is greater than a thermal expansion coefficient of the third material.

According to an embodiment of the invention, the supporting element and the clamping piece are integrally formed and include a fifth material and a sixth material. The sixth material is located between the fifth material and the optical films.

According to an embodiment of the invention, a thermal expansion coefficient of the sixth material is greater than a thermal expansion coefficient of the fifth material.

According to an embodiment of the invention, the thermal expansion coefficient of the fifth material ranges from about 1 μm/m° C. to about 7 μm/m° C.

According to an embodiment of the invention, the thermal expansion coefficient of the sixth material ranges from about 22 μm/m° C. to about 30 μm/m° C.

Based on the above, the clamping piece is made of the bi-material in the embodiments of the invention. Here, a portion of the clamping piece close to the optical films has a thermal expansion coefficient greater than a thermal expansion coefficient of the other portion of the clamping piece away from the optical films. Therefore, when the backlight module is moved or undergoes the vibration inspection under normal temperature, the clamping piece can firmly secure the optical films onto the light guide plate, so as to prevent scratches caused by relative movement between the optical films and the light guide plate or movement of the optical films. Moreover, when the backlight module is being operated, the clamping piece gradually releases the optical films together with an increase in the temperature of the backlight module, e.g., from about 20° C. to about 70° C. Thereby, the optical films in the operating backlight module are not deformed by the uneven force and do not become wavy, which often happens according to the related art. As such, optical performance of the backlight module can be effectively improved.

In order to make the aforementioned and other features and advantages of the disclosure comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1A:
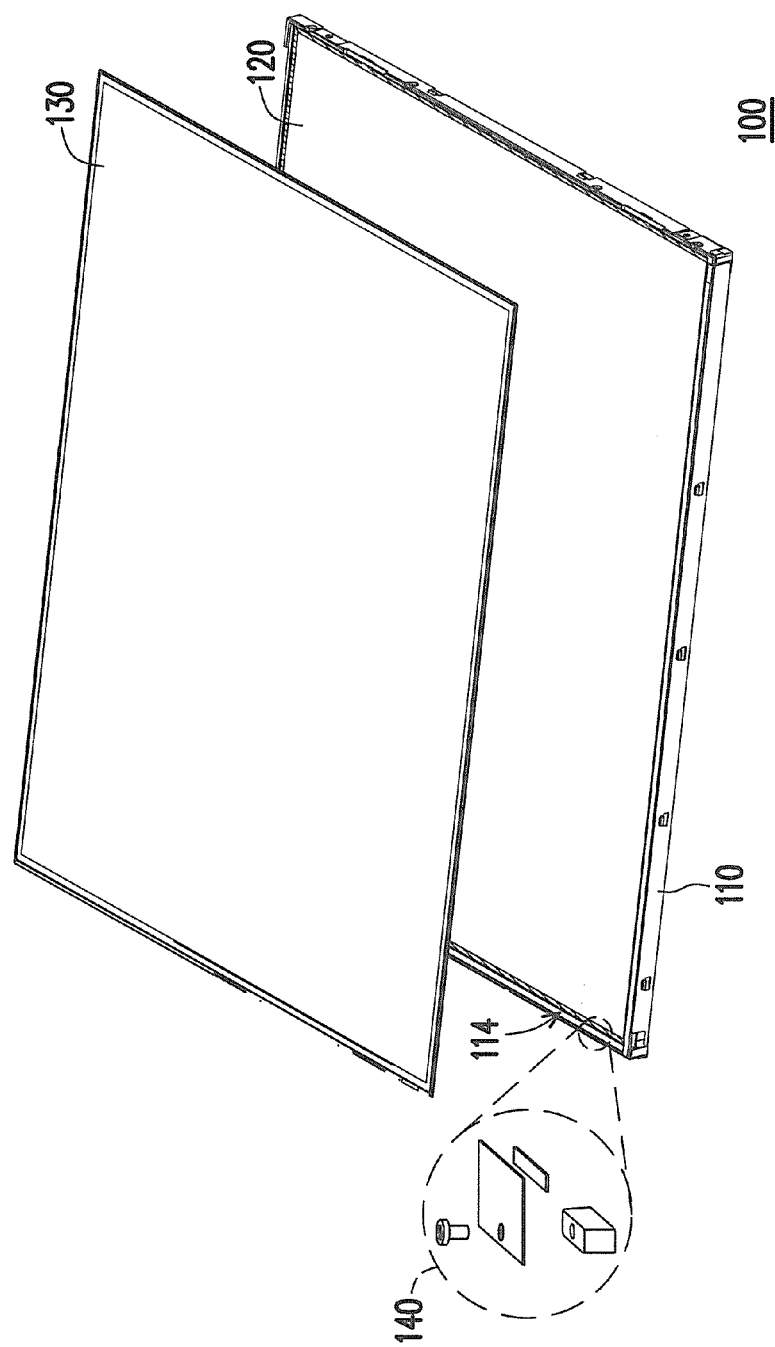
FIG. 1A is an exploded view illustrating a backlight module according to an embodiment of the invention.
Figure 1B:
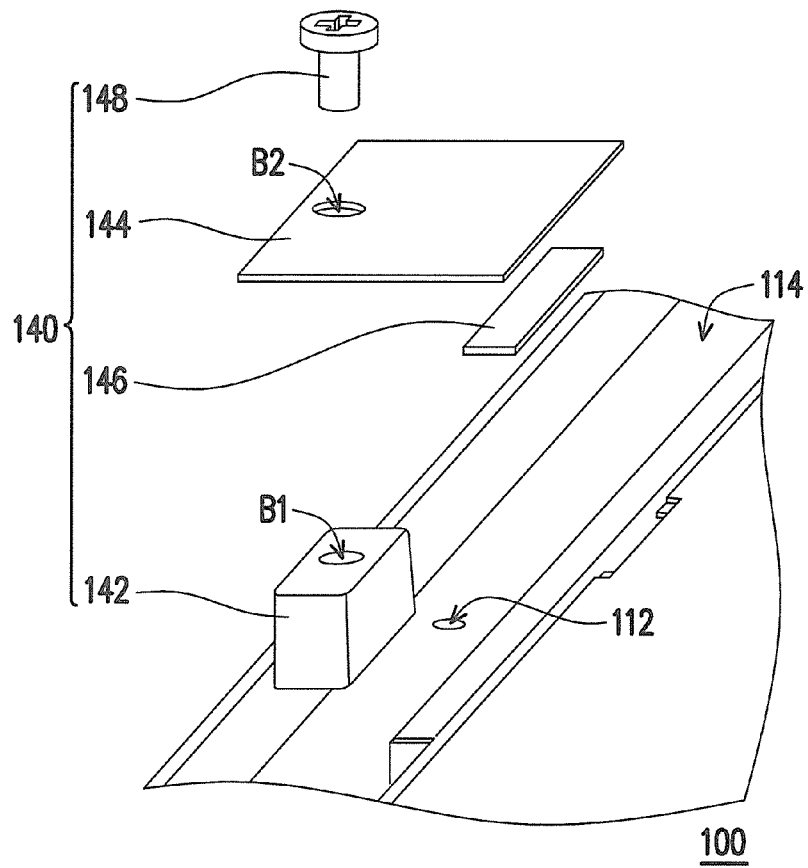
FIG. 1B is a partially enlarged view of FIG. 1A.
Figure 1C:
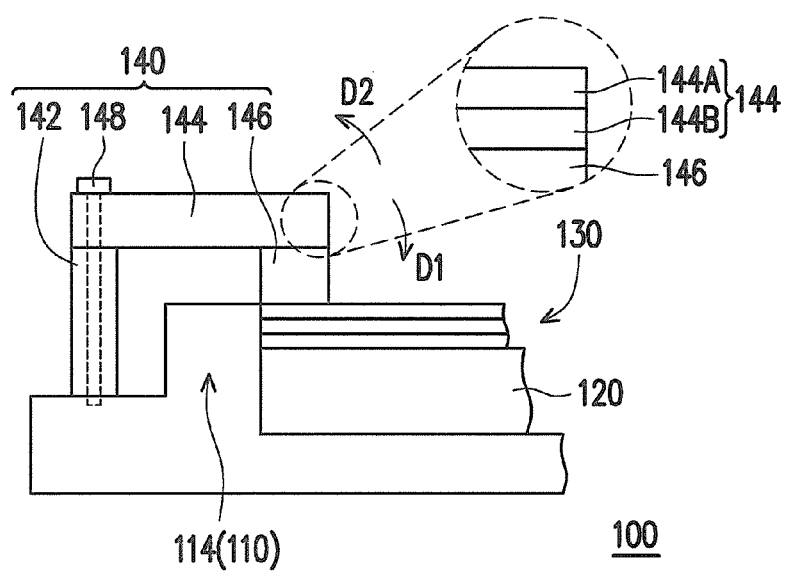
FIG. 1C is a cross-sectional view illustrating the backlight module depicted in FIG. 1B after being assembled.

FIG. 1A is an exploded view illustrating a backlight module according to an embodiment of the invention. FIG. 1B is a partially enlarged view of FIG. 1A. FIG. 1C is a cross-sectional view illustrating the backlight module depicted in FIG. 1B after being assembled. Here, some components are asymmetrically enlarged for clear illustrations. With reference to FIG. 1A to FIG. 1C, in this embodiment, the backlight module 100 includes a back bezel 110, a light guide plate 120, a plurality of optical films 130, and a clamping device 140. The light guide plate 120 is disposed in an area enclosed by a periphery structure 114 of the back bezel 110, and the back bezel 110 can be made of metal or plastic. The optical films 130 are disposed on the light guide plate 120. The clamping device 140 includes a supporting element 142, a clamping piece 144, and a cushion element 146. The supporting element 142 protrudes from the periphery structure 114 of the back bezel 110, and the supporting element 142 can be a metal protrusion or a plastic bump. The clamping piece 144 is disposed on the supporting element 142 and extends from the periphery structure 114 of the back bezel 110 to the optical films 130. The cushion element 146 is disposed between the clamping piece 144 and the optical films 130.

Note that the clamping piece 144 of this embodiment is a bi-material clamping piece having an optimal thickness that ranges from about 0.5 mm to about 2 mm. Said optimal thickness range is determined based on the required thickness of the backlight module. Excessive thickness of the clamping piece 144 results in insufficient space, and overly small thickness of the clamping piece 144 leads to non-compliance with the requirements for deformation and strength. On the other hand, a Young's modulus of the clamping piece 144 ranges from about 100 GPa to about 180 GPa. The clamping piece 144 includes a first material 144A and a second material 144B. The second material 144B is located or directly connected between the first material 144A and the cushion element 146, and is also located between the first material 144A and the optical films 130. The first material 144A and the second material 144B both have a layer-like structure. A thermal expansion coefficient of the second material 144B ranges from about 22 $\mu m/m°C$ to about 30 $\mu m/m°C$, and the second material 144B is a Cu—Ni—Mn alloy layer or a Zn—Cu alloy layer, for instance. A thermal expansion coefficient of the first material 144A ranges from about 1 $\mu m/m°C$ to about 7 $\mu m/m°C$, and the first material 144A is a Fe—Ni alloy layer, for instance. The first material 144A and the second material 144B are not limited to metal or alloys. Since the thermal expansion coefficient of the second material 144B is greater than the thermal expansion coefficient of the first material 144A, the deformation of the clamping piece 144 caused by temperature allows the clamping piece 144 to clamp or release the optical films 130. That is to say, the first material 144A and the second material 144B are mainly selected from materials that have relatively significant deformation and can supply a sufficient fixing force within the same temperature range, e.g., 20° C.~70° C.

In this embodiment, according to the information of the bi-material alloy provided by Eastern Union Co., Ltd., the first material 144A and the second material 144B can be combined through a liquid-solid composite process, such as a casting process, a hot-pip galvanized process, a spray forming process, a thermal spray process, and so forth. The bi-metal alloy can also be formed by a solid-solid composite process, such as a diffusion bonding process, an explosion bonding process, a clad roll bonding process, and so on. The method of forming the bi-material alloy is not limited herein.

Given the backlight module 100 is not operated and is under normal temperature, the clamping piece 144 firmly secures the optical films 130 onto the light guide plate 120 in a first direction D1. Accordingly, no matter the backlight module 100 is moved or undergoes the vibration inspection, the optical films 130 can be fixed between the clamping piece 144 and the light guide plate 120, so as to prevent the scratches caused by movement of the optical films 130 according to the related art. On the other hand, when the backlight module 100 is being operated, the temperature of the backlight module 100 is gradually increased (for instance, from 20° C. to 70° C.), and the thermal deformation of the second material 144B is more significant than the thermal deformation of the first material 144A. The clamping piece 144 is thus deformed little by little in a second direction D2 opposite to the first direction D1, and the optical films 130 are released. Thus, when the backlight module 100 is being operated, the optical films 130 are not deformed by the uneven force and do not become wavy, which often happens according to the related art. As such, optical performance of the backlight module 100 can be effectively improved.

Additionally, in this embodiment, the cushion element 146 is made of soft materials, e.g., rubber or silica gel, so as to prevent the optical films 130 from being scratched. A friction coefficient of the cushion element 146 ranges from about 0.5 to about 1, and therefore an appropriate friction force supplied by the cushion element 146 and a normal force provided by the clamping piece 144 are applied to firmly clamp the optical films 130.

Besides, in this embodiment, the supporting element 142 has a first through hole B1, and the clamping piece 144 has a second through hole B2. The clamping device 140 can further include a securing element 148. The clamping piece 144 is locked onto the back bezel 110 by the securing element 148 that passes through the first and the second through holes B1 and B2 and lodged into a securing hole 112 of the back bezel 110. The structure of the securing element 148 by which the clamping piece 144 is locked onto the back bezel 110 is not limited in this embodiment. The securing element 148 can be a screw, a pin, or any other fixing element. In this embodiment, the supporting element 142 is independent from the back bezel 110, while the supporting element 142 and the back bezel 110 in another embodiment of the invention can be integrally formed. For instance, the supporting element 142 can be a protrusion formed by punching and molding the back bezel 110.

Figure 2:
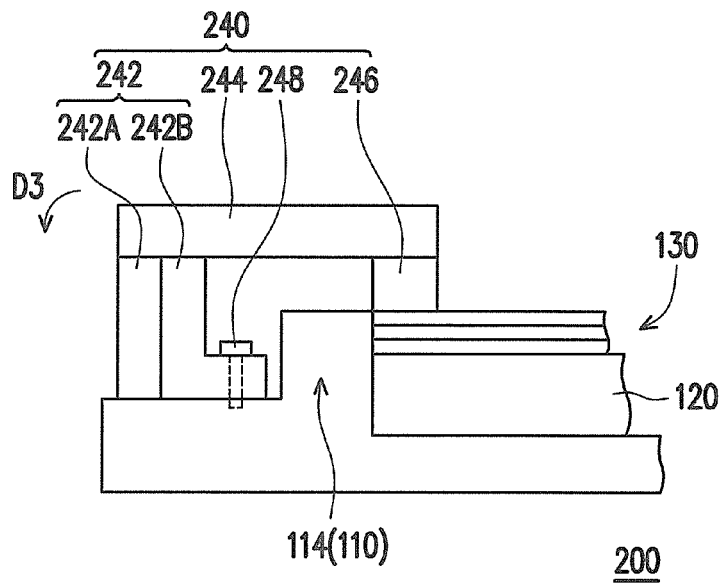
FIG. 2 is a schematic view illustrating a backlight module according to another embodiment of the invention.

FIG. 2 is a schematic view illustrating a backlight module according to another embodiment of the invention. In this embodiment, a clamping device 240 includes a supporting element 242, a clamping piece 244, a cushion element 246, and a securing element 248. Different from the previous embodiment, this embodiment provides the supporting element 242 which is a bi-material supporting element and is fixed onto the back bezel 110 by the securing element 248. The supporting element 242 includes a third material 242A and a fourth material 242B. The fourth material 242B is located between the third material 242A and the optical films 130, and is also located between the third material 242A and the optical films 130. The third material 242A has a layer-like or a plate-like structure, and the fourth material 242B has an L-shaped structure. In this embodiment, the clamping piece 244 is adhered or locked onto at least one of the third material 242A and the fourth material 242B, while the clamping piece in another embodiment (not shown) can be merely connected to the third material or the fourth material. Moreover, in another embodiment (not shown), the clamping piece and the third material can be integrally formed, or the clamping piece and the fourth material can be integrally formed.

According to this embodiment, a thermal expansion coefficient (ranging from about 22 μm/m° C. to about 30 μm/m° C.) of the fourth material 242B is greater than a thermal expansion coefficient (ranging from about 1 μm/m° C. to about 7 μm/m° C.) of the third material 242A. When the backlight module 200 is being operated, the rising temperature allows the supporting element 242 to deform the clamping piece 244 in a third direction D3, so as to release the optical films 130. Effects achieved in this embodiment can also be accomplished in the previous embodiment. Besides, in this embodiment, material costs can be reduced, and easy assembly is achieved.

Figure 3:
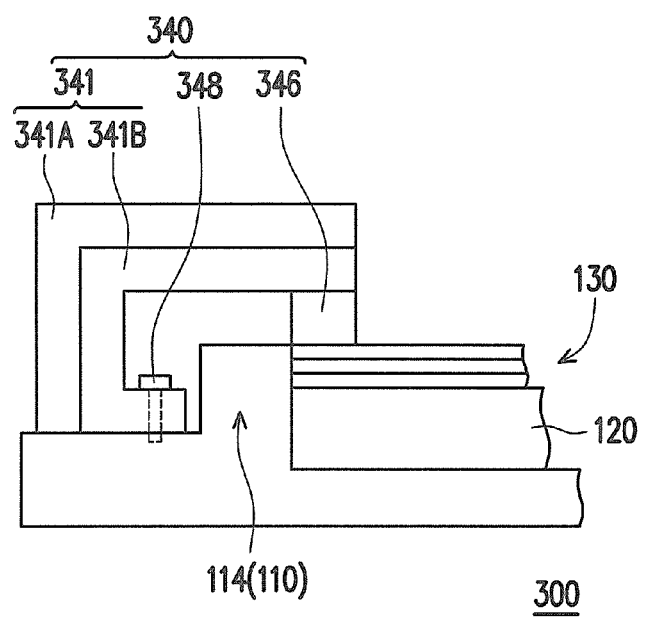
FIG. 3 is a schematic view illustrating a backlight module according to still another embodiment of the invention.

FIG. 3 is a schematic view illustrating a backlight module according to still another embodiment of the invention. In this embodiment, a clamping device 340 includes a clamping structure 341, a cushion element 346, and a securing element 348. Different from the previous embodiment, this embodiment provides the clamping structure 341 of which the supporting element and the clamping piece are integrally formed. The clamping structure 341 includes a fifth material 341A and a sixth material 341B. The sixth material 341B is located or directly connected between the fifth material 341A and the cushion element 346, and is also located between the fifth material 341A and the optical films 130. The fifth material 341A has an L-shaped structure, and the sixth material 341B has a U-shaped structure. Here, the sixth material 341B is similar to the second material 144B of the embodiment depicted in FIG. 1A or the fourth material 242B of the embodiment depicted in FIG. 2, and the fifth material 341A is similar to the first material 144A of the embodiment depicted in FIG. 1A or the third material 242A of the embodiment depicted in FIG. 2. Therefore, the optical films 130 in the backlight module 300 of this embodiment, as those in the backlight modules 100 and 200 of the previous embodiments, can be firmly fixed.

In light of the foregoing, a portion of the bi-material clamping piece close to the optical films has a thermal expansion coefficient greater than a thermal expansion coefficient of the other portion of the clamping piece away from the optical films according to the embodiments of the invention. Therefore, when the backlight module is moved or undergoes the vibration inspection under normal temperature, the clamping piece can firmly secure the optical films onto the light guide plate, so as to prevent scratches caused by relative movement between the optical films and the light guide plate or movement of the optical films. Moreover, when the backlight module is being operated, the clamping piece gradually releases the optical films together with an increase in the temperature of the backlight module. Thereby, the optical films in the operating backlight module are not deformed by the uneven force and do not become wavy, which often happens according to the related art. As such, optical performance of the backlight module can be effectively improved.

It will be apparent to those skilled in the art that various modifications and variations can be made to the disclosure without departing from the scope or spirit of the disclosure. In view of the foregoing, it is intended that the disclosure cover modifications and variations of this disclosure provided they fall within the scope of the following claims and their equivalents.

What is claimed is:

1. A backlight module comprising:
a back bezel having a periphery structure;
a light guide plate disposed in an area enclosed by the periphery structure of the back bezel;
a plurality of optical films disposed on the light guide plate; and
a clamping device comprising:
a supporting element protruding from the back bezel;
a clamping piece comprising a plurality of stacked layers, disposed on the supporting element and extending from the back bezel to the optical films; and
a cushion element disposed between the clamping piece and the optical films, wherein the clamping piece comprising the stacked layers is a bi-material clamping piece and comprises:
a first material layer, wherein the first material layer is a first metal layer; and
a second material layer located between the first material layer and the optical films, wherein the second material layer is a second metal layer different from the first metal layer.

2. The backlight module as claimed in claim 1, wherein a thermal expansion coefficient of the second material layer is greater than a thermal expansion coefficient of the first material layer.

3. The backlight module as claimed in claim 2, wherein the thermal expansion coefficient of the first material layer ranges from about 1 μm/m° C. to about 7 μm/m° C.

4. The backlight module as claimed in claim 2, wherein the thermal expansion coefficient of the second material layer ranges from about 22 μm/m° C. to about 30 μm/m° C.

5. The backlight module as claimed in claim 1, wherein the first metal layer is a Fe—Ni alloy layer.

6. The backlight module as claimed in claim 1, wherein the second metal layer is a Cu—Ni—Mn alloy layer or a Zn—Cu alloy layer.

7. The backlight module as claimed in claim 1, wherein a Young's modulus of the bi-material clamping piece ranges from about 100 GPa to about 180 GPa.

8. The backlight module as claimed in claim 1, wherein a thickness of the bi-material clamping piece ranges from about 0.5 mm to about 2 mm.

9. The backlight module as claimed in claim 1, wherein a material of the cushion element is rubber or silica gel.

10. The backlight module as claimed in claim 1, wherein a friction coefficient of the cushion element ranges from about 0.5 to about 1.

11. The backlight module as claimed in claim 1, wherein the supporting element has a through hole, and a bi-material clamping piece is locked onto the back bezel by a securing element passing through the through hole.

* * * * *